Sept. 3, 1957  B. I. ULINSKI  2,804,984
FRAME CONSTRUCTION FOR INDUSTRIAL TRUCK
Filed April 6, 1954  5 Sheets-Sheet 1
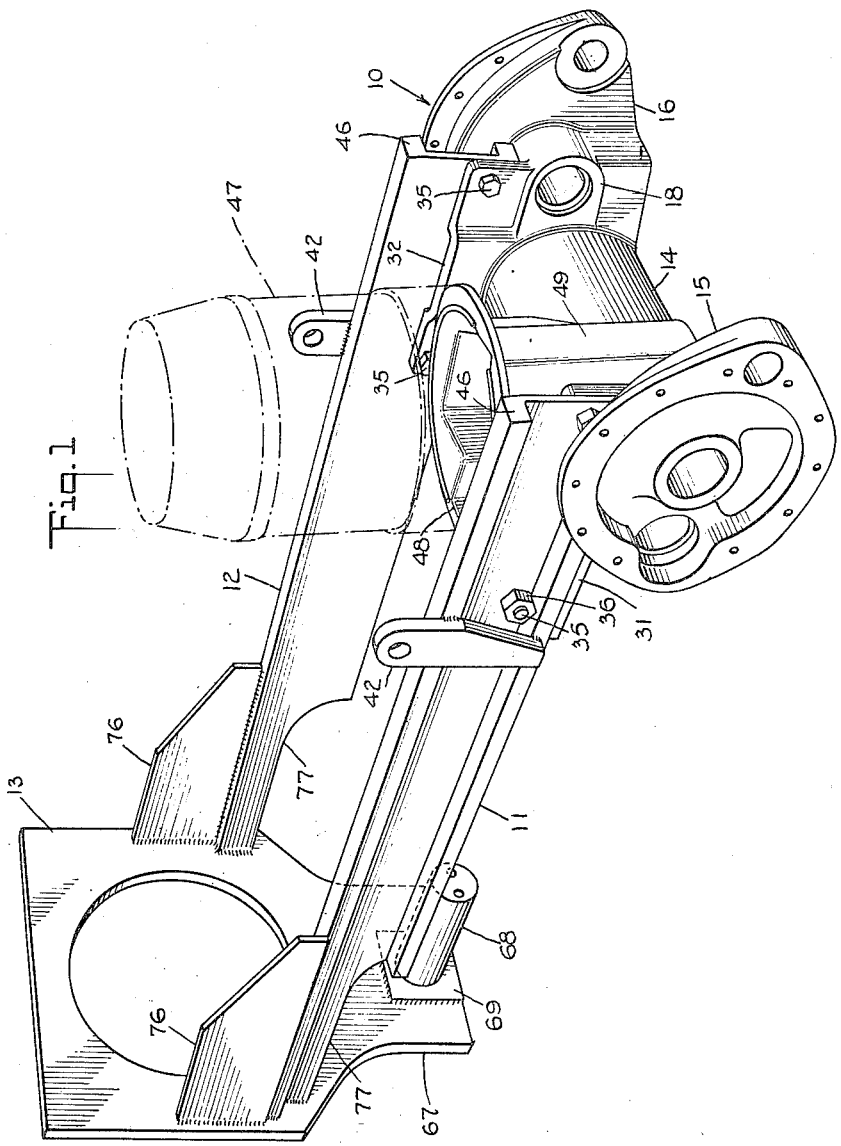
INVENTOR
B. I. Ulinski
BY
A. H. Golden
ATTORNEY Sept. 3, 1957 B. I. ULINSKI 2,804,984
FRAME CONSTRUCTION FOR INDUSTRIAL TRUCK
Filed April 6, 1954 5 Sheets-Sheet 2
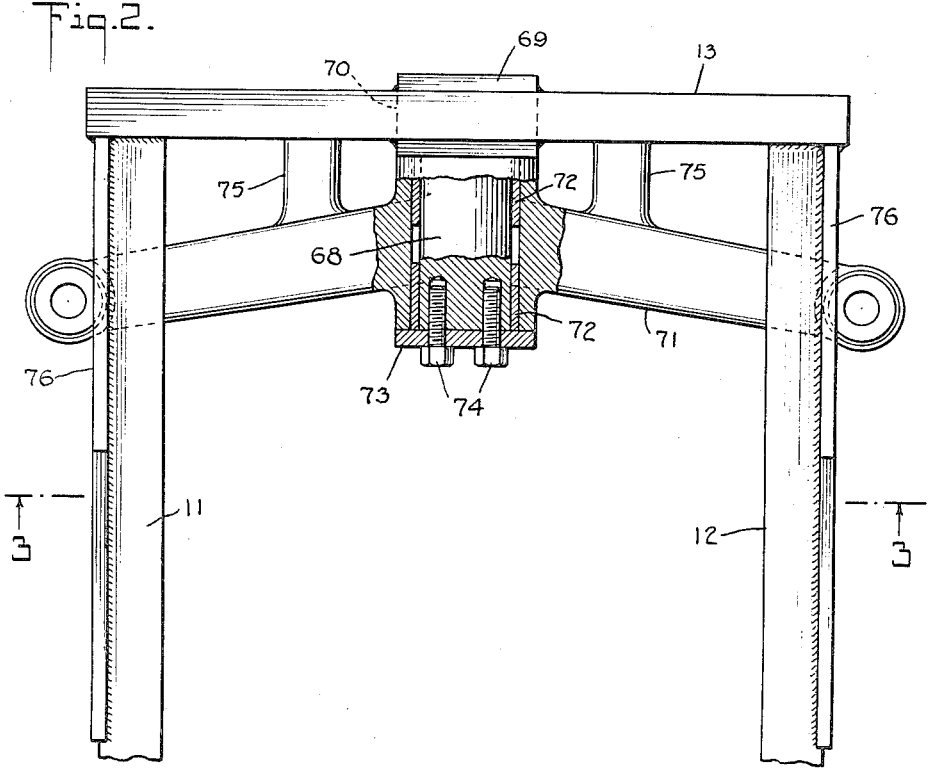
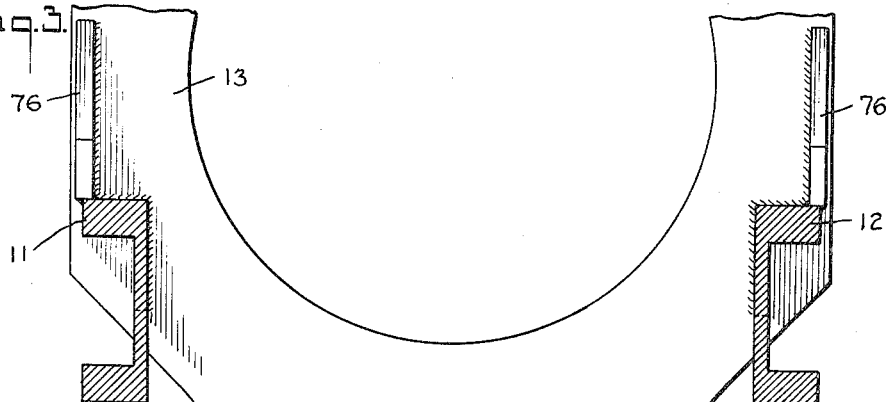
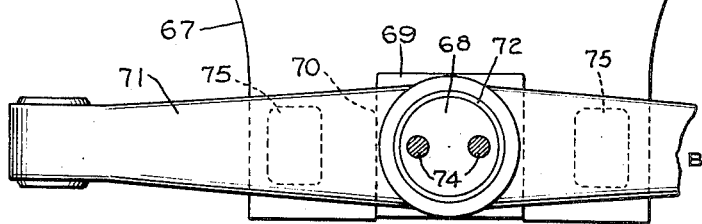
INVENTOR
B. I. Ulinski
BY
A. H. Golden
ATTORNEY Sept. 3, 1957 B. I. ULINSKI 2,804,984
FRAME CONSTRUCTION FOR INDUSTRIAL TRUCK
Filed April 6, 1954 5 Sheets-Sheet 3
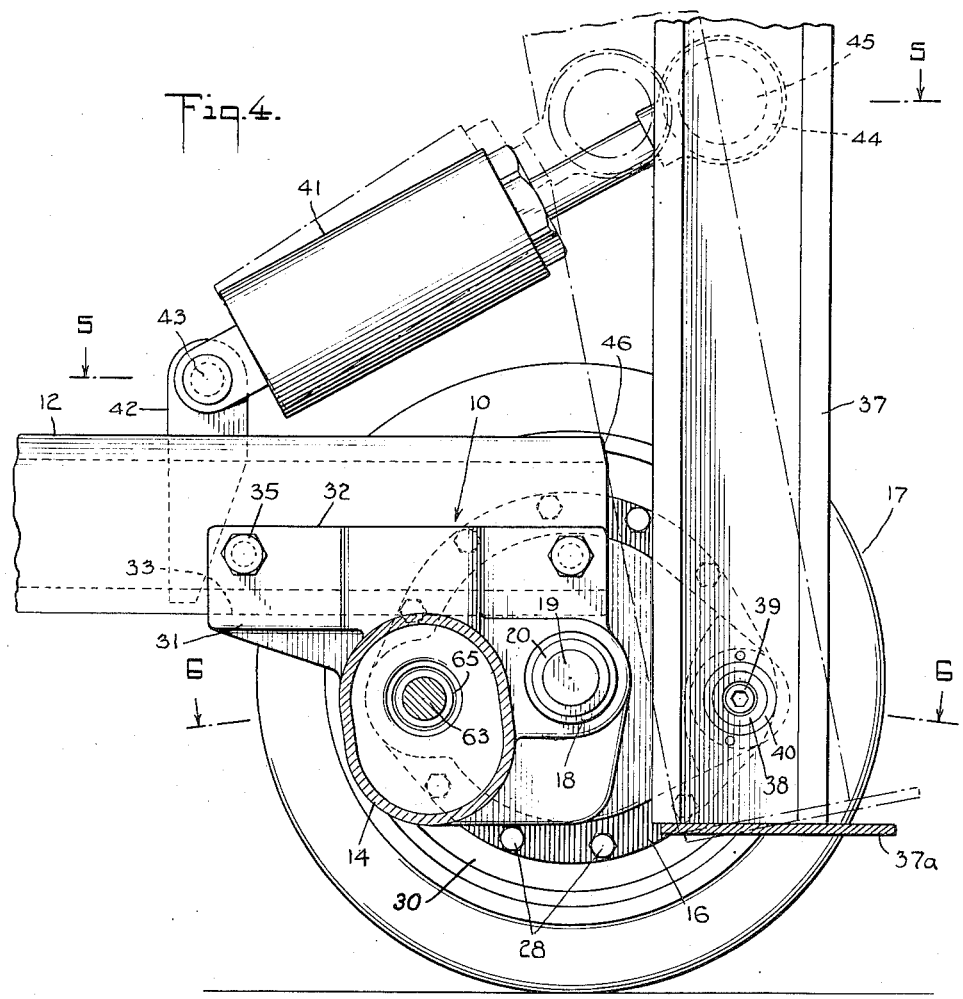

Sept. 3, 1957 B. I. ULINSKI 2,804,984
FRAME CONSTRUCTION FOR INDUSTRIAL TRUCK
Filed April 6, 1954 5 Sheets-Sheet 4

INVENTOR
B. I. Ulinski
BY A. H. Golden
ATTORNEY

Sept. 3, 1957   B. I. ULINSKI   2,804,984
FRAME CONSTRUCTION FOR INDUSTRIAL TRUCK
Filed April 6, 1954   5 Sheets-Sheet 5

INVENTOR
B. I. Ulinski
BY
A. H. Golden
ATTORNEY

United States Patent Office 2,804,984
Patented Sept. 3, 1957

2,804,984

FRAME CONSTRUCTION FOR INDUSTRIAL TRUCK

Bronislaus I. Ulinski, Chicago, Ill., assignor to The Yale & Towne Manufacturing Company, Stamford, Conn., a corporation of Connecticut Application April 6, 1954, Serial No. 421,217

14 Claims. (Cl. 214—674)

My invention relates to main frame structure for industrial lift trucks. It will be appreciated that the construction of the main frame in trucks of this class presents a considerable problem because of the compact nature of these trucks, and also because of the particular arrangement of the various truck parts and mechanisms relatively to the frame. Trucks of this class are equipped with a pair of uprights for mounting a lifting carriage relatively to the main frame. These uprights are mounted in positions juxtaposed to the front wheels of the truck in order that the uprights may have a high degree of stability, and usually also the uprights are mounted so that they may tilt in a fore-and-aft direction relatively to the main frame. The front wheels of the truck are traction wheels, and these wheels obviously must be mounted and driven through means so arranged as not to interfere with the uprights.

The steering of the truck is effected by means acting through the rear wheels of the truck. These rear wheels preferably are mounted to move relatively to one another in a vertical direction to compensate for irregularities in the surface of the ground over which the truck moves. The mechanism on the truck includes also a source of power, and hydraulic means for actuating the lifting carriage and the uprights. The main frame in trucks of the particular class supports all of this mechanism either directly or indirectly, with the mechanism arranged to utilize the rather limited space that is available.

A study of the prior art will demonstrate that heretofore those working in the lift truck industry have created from a series of structural members a frame to function as the main frame or chassis of the truck. On this main frame they have placed the various parts I have hereinabove set forth, and which are the parts that must be utilized in a truck of the particular class. I have departed entirely from this concept of the prior art by utilizing necessary parts of the truck to form the main frame of the truck. In other words, the main frame of the truck utilizes as an integral and functional part thereof certain portions that have heretofore been appendages or attachments to the main frame. Thus, the pivot shaft for the trailing or steering axle of my truck and its support means are utilized to form one end of the main frame. Similarly, the traction unit of my truck is utilized to form the other end of the main frame. The tilting uprights are controlled in their movement merely through the mounting of the uprights in particular relation to the rest of the structure. It is this relationship of the parts that is the basis of the concept hereinafter to be described more in detail.

As a very important feature of my invention, and in accordance with my concept, I utilize a novel traction unit as the front end member of the frame. More particularly, I form the traction unit with seating surfaces for the side members. These seating surfaces are arranged to extend a considerable distance along the length of each frame side member. Bolts assemble the side members to the seating surfaces, and I thereby effect an extremely rigid connection between the side members and the traction unit, with the unit actually forming a part of the main frame.

As a further feature of the invention, I construct the traction unit to hold the side members in positions that are widely spaced relatively to one another, and closely juxtaposed to the wheels of the truck. The particular arrangement increases the space that is available for the mounting of truck mechanism between the side members, while enabling me, at the same time, to utilize simple continuous side members. As a further part of this feature, the uprights are mounted in alignment with the side members and with end surfaces on the side members acting as stops to limit the tilting movement of the uprights. To accomplish this, I form on the traction unit integral opposed side portions extending forwardly from the side frame members to provide, in effect, extensions of these members. I equip each of these forwardly extending portions of the traction unit with a pivot for one of the uprights. These pivots extend inwardly from the side portions of the traction unit to mount the uprights in aligned relation to the side members of the frame, and support the uprights to tilt in a transverse axis. For controlling this tilting movement, I utilize hydraulic rams so mounted as to be substantially aligned both with the uprights and with the side members of the frame.

As another feature of the invention, I utilize my rear axle support as the rear end member of the frame. More particularly, this axle support is a plate secured in a vertical position between the rear ends of the side members. A lower portion of this plate extends downwardly a considerable distance below the side members of the frame, and has upon it an integral pivot in the longitudinal axis of the truck. This pivot extends from the plate toward the front of the truck, and is adapted to support a rear axle in a transverse position below the side members. In this arrangement, the rear axle can rock relatively to the main frame, but this axle, together with its mounting means, does not obstruct the space between the side members or the space beyond the end of the main frame. Furthermore, the axle is quite low and thereby enables other truck mechanism to be mounted below the side members at the rear end of the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a perspective view showing my novel frame construction.

Fig. 2 is a plan view, partly in section, showing the rear end of my frame.

Fig. 3 is a view on the line 3—3 of Fig. 2.

Fig. 4 shows the front part of the truck in longitudinal section.

Figure 5:
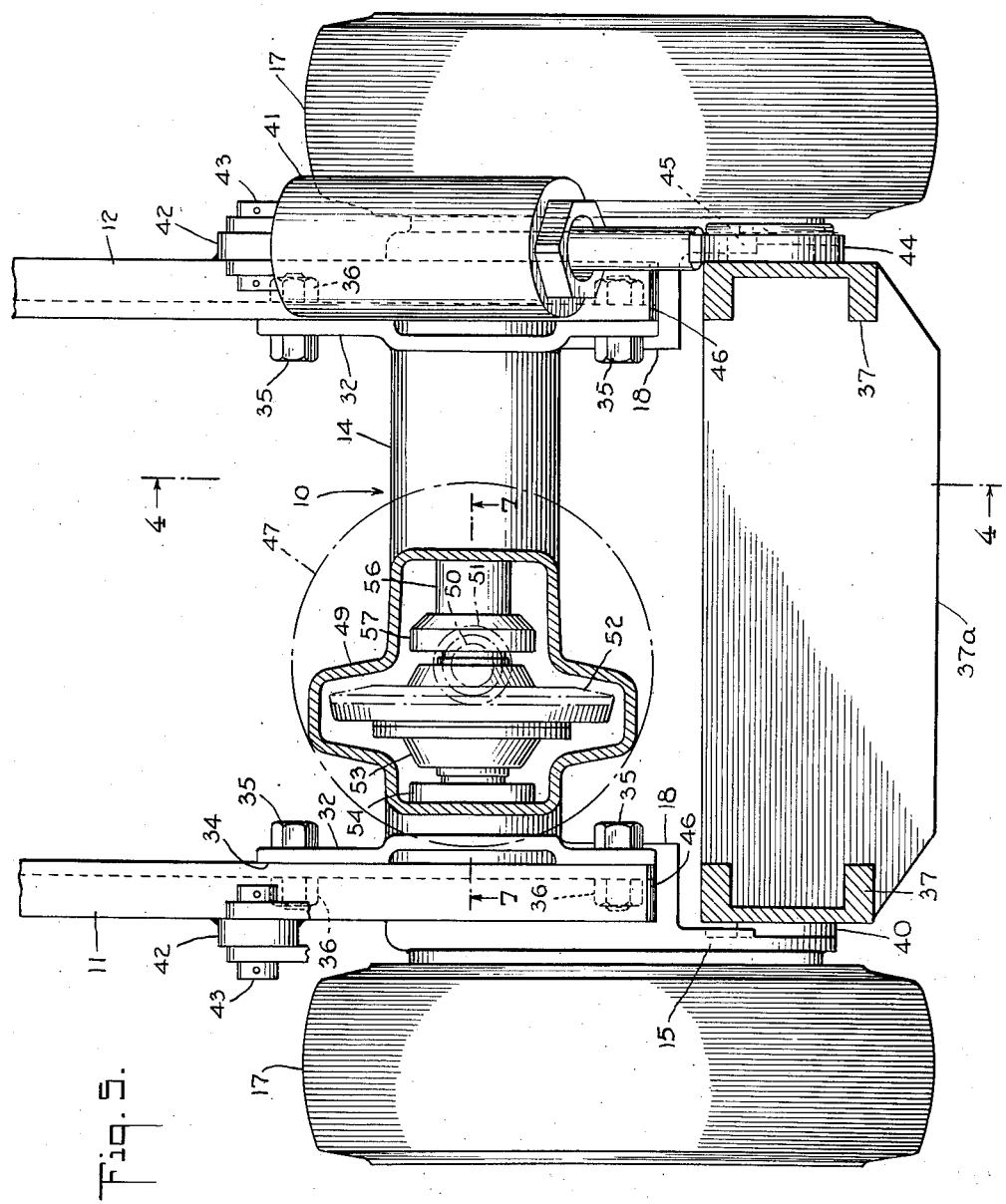
Figure 6:
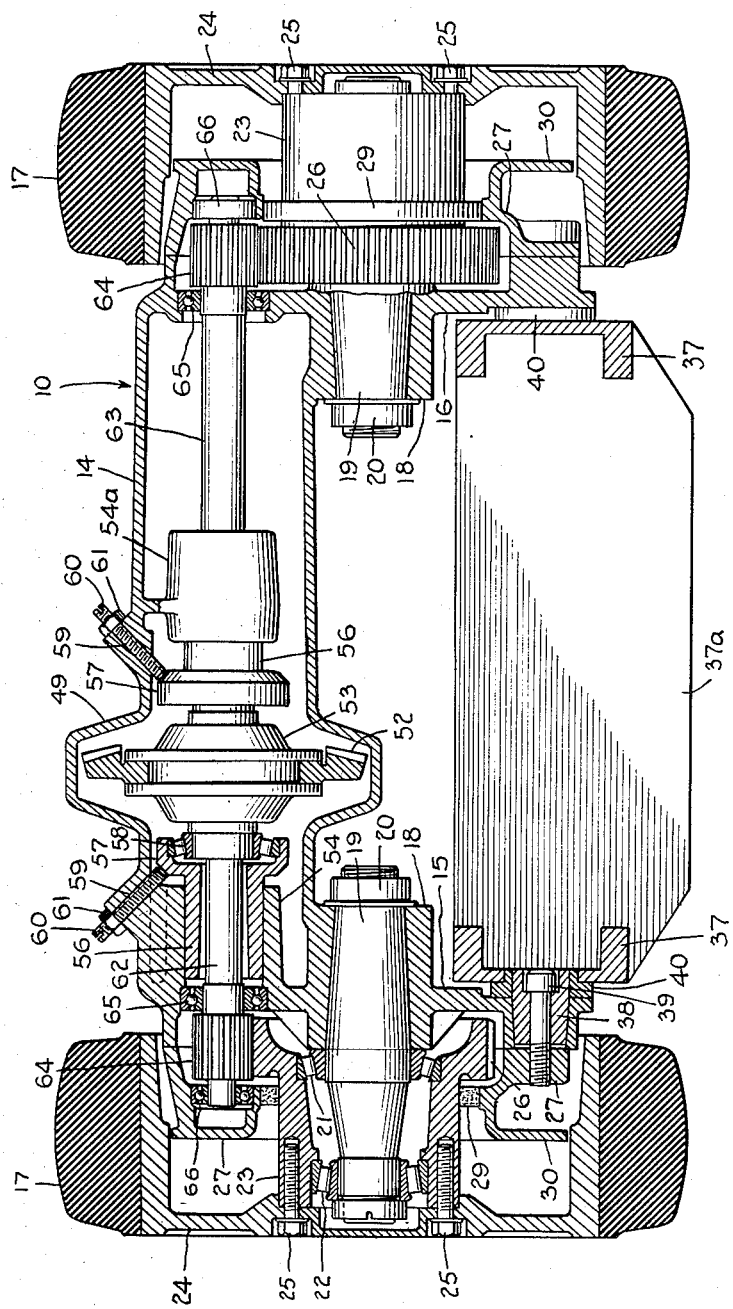

Figs. 5 and 6 are views on the lines 5—5 and 6—6 of Fig. 4.

Fig. 7 is a view on the line 7—7 of Fig. 5.

As may be seen clearly in Fig. 1, I utilize in my novel frame construction a traction unit indicated generally by the numeral 10, a pair of opposed side members 11 and 12 extending rearwardly from the traction unit 10, and an end member 13 at the rear ends of the side members. To appreciate to the fullest extent the novel features of my frame, it is necessary first to understand the construction of the traction unit 10, and therefore I shall first describe this traction unit and the manner in which it co-acts with other parts of the truck.

The body of the traction unit 10 is a cast metal housing having a tubular transverse portion 14, and forwardly extending side portions 15, 16 at opposed ends of the transverse portion 14. As best shown in Fig. 6, I utilize the side portions 15, 16 for mounting a pair of traction wheels 17 at the front of the truck, and for this purpose I form each side portion 15, 16 with an integral support 18 at the forward side of the transverse portion 14. The supports 18 are formed with openings for tapered stub shafts 19, and I utilize nuts 20 to retain the stub shafts 19 in these openings in fixed relation to the traction unit housing. The stub shafts 19 extend outwardly from the side portions 15, 16, and are equipped with inner and outer roller bearings 21, 22. Hubs 23 rotate on the bearings 21, 22, and I so mount the traction wheels 17 on the hubs 23 as actually to encircle parts of the traction unit housing. Preferably, the wheels 17 are constructed with disk portions 24 at the outer sides of the wheels, these disk portions being secured by bolts 25 to the outer ends of the hubs 23 to mount the wheels on the hubs. Referring still to Fig. 6, the inner end of each wheel hub 23 is formed integrally with a gear 26 which is driven by means, to be described in due course, for rotating the traction wheels 17.

For each of the side portions 15, 16 of the housing, I provide a cover member 27 attached to the side portion by bolts 28, as best seen in Fig. 4. The cover member 27 encloses the gear 26 on each hub, and has a central opening through which the hub 23 projects in an outward direction, with a packing 29 installed in this opening between the hub and the cover member 27. Preferably, each cover member 27 has a circular flange 30 for mounting a brake, not shown, to act within the wheel.

It will be observed that the arrangement I have described places the traction wheels 17 in a rather compact relationship to the transverse housing portion 14. This enables me to utilize the housing portion 14 for mounting the forward ends of the frame side members 11, 12 in widely spaced relation to one another, and quite close to the inner sides of the traction wheels. Referring particularly to Figs. 1, 4, and 5, I form upon each end of the transverse housing portion 14, and at the upper side of this portion, a horizontal flange 31 and a vertical flange 32. These flanges 31, 32 extend a considerable distance in a fore-and-aft direction relatively to the truck, and have seating surfaces 33, Fig. 4, for the bottom surfaces of the side members 11, 12, and vertical seating surfaces 34, Fig. 5, for the inner sides of the side members. Actually, the horizontal seating surface 33 at each end of the transverse housing portion 14 extends in part upon the upper side of the support 18 for the wheel shaft, as shown in Fig. 4, whereby the flange 31 may be relatively short. To secure the side frame members 11 and 12 relatively to the seating surfaces 33, 34, I utilize bolts 35, best shown in Fig. 5, these bolts extending through openings in the side members 11, 12 and in the vertical flanges 32, and held by nuts 36. It may be observed, of course, that I have utilized channel members for the side members 11, 12, but it is to be understood that these side members may have other sectional form, with the seating surfaces 33, 34 adapted to seat relatively to the particular section. Preferably, the arrangement is such that the side members 11, 12 are positioned with their ends above the wheel axis as represented by the stub shafts 19. In the construction that I have now described, the seating surfaces 33, 34 are extremely effective to hold the side members 11, 12 of the frame very rigidly assembled to the traction unit 10, with the traction unit actually forming a part of the truck frame.

I utilize the traction unit 10 for mounting a pair of uprights 37 on the truck in positions aligned longitudinally with the side members 11, 12 of the truck frame. To accomplish this, I form the side portions 15, 16 of the unit to extend forwardly in substantially aligned relation to the outer sides of the side members 11, 12, as may be clearly seen in Fig. 5. Furthermore, as shown in Fig. 6, I form the side portions 15, 16 at their forward ends with transverse openings in which I mount tapered pivots 38. These pivots project inwardly from the side portions 15, 16 in opposed relation to one another, and are secured preferably by bolts 39 extending axially through the pivots 38 and engaged in threaded openings in the cover members 27. Upon the pivots 38 are bearings 40 engaged in openings in the uprights 37. Preferably, the uprights 37 are equipped with an integral cross member 37a that acts, by holding the uprights in predetermined spaced relation, to hold these uprights assembled on the pivots 38. The pivots 38 thereby support the uprights in longitudinally aligned relation to the side frame members 11, 12, and enable the uprights to tilt in a fore-and-aft direction relatively to the truck frame. Furthermore, because the pivot axis is spaced in a forward direction from the wheel axis, it is possible in this arrangement to support the uprights 37 at points that are longitudinally aligned with the uprights and also positioned at the lower ends of the uprights. Obviously, the uprights 37, when mounted in this way, are quite closely juxtaposed to the inner sides of the traction wheels 17.

For tilting the uprights 37 on the pivots 38, I utilize rather conventional tilt rams 41, Figs. 4 and 5, but because of the aligned relation of the uprights 37 to the side frame members 11, 12, I can utilize a novel mounting whereby the tilt rams 41 are substantially aligned both with the uprights and with the side members. Thus, to support the rear ends of the rams 41, I merely weld to each side members 11, 12, an upwardly extending bracket 42, with the ram pivoted to the bracket through a pin 43. I form the forward end of the ram with a bearing 44, and this bearing is positioned against the outer surface of an upright 37 and pivoted thereto through a stud 45. The tilt rams 41 thereby act through forces that are applied in alignment with the side frame members 11, 12 and the uprights 37. Furthermore, because of the particular mounting of the uprights, I can utilize the forward end portions of the side members 11 and 12 as stops to limit the rearward tilting of the uprights 37. For this purpose, I prefer to form particular stop surfaces 46 upon the ends of the side members 11, 12, as best seen in Fig. 4.

I shall now describe more particularly the means whereby I drive the traction wheels 17 on the traction unit 10. I equip the traction unit 10 with a motor 47, indicated in dotted lines in Figs. 1 and 5, utilizing for this purpose the space between the forward ends of the side frame members 11, 12. The transverse housing portion 14 of the traction unit has an enlarged section forming a casing 49 that is open at the top, as shown in Figs. 1 and 7. On the open top of the casing 49 I form a circular flange 48 through which I mount the motor 47 in an approximately vertical position above the transverse portion 14 of the traction unit. The motor 47 has a shaft 50 extending downwardly into the casing 49, Fig. 7, this shaft having upon it a pinion 51 meshed with a ring gear 52 on a differential 53 in the casing 49.

For mounting the differential 53, I contribute extremely novel means that enables me very readily to adjust the differential 53 and its ring gear 52 relatively to the motor pinion 51. Thus, referring particularly to Fig. 6, I form a pair of supports 54, 54a integrally within the transverse housing portion 14 at opposed sides of the enlarged casing 49, each of these supports 54, 54a having therethrough an opening in the axis of the differential 53. In the opening of each support 54, 54a I mount a slidable sleeve 56 having at its inner end an enlarged circular seating portion 57. I utilize these seating portions 57 to support roller bearings 58 for opposed ends of the differential 53. Further, I form the transverse housing portion 14 at opposed sides of the casing 49 with threaded openings 59, each of these openings being so located that its axis is directed inwardly toward the seating portion 57 on one of the sleeves 56. Into the openings 59 I insert screws 60 in opposed relation to one another, these screws bearing against the seating portions 57, as very clearly seen in Fig. 6, and thereby adapted to adjust the sleeves 56 in the axis of the differential 53. Locking nuts 61 on the adjusting screws 60 prevent accidental movement of these screws. Those skilled in the art will appreciate that the screws 60 enable me to adjust the differential 53 and the ring gear 52 relatively to the motor pinion 51, this adjustment being accomplished very readily and without the necessity for disassembling parts of the traction unit.

Splined to opposed sides of the differential 53 are a pair of drive shafts 62, 63, Fig. 6. These drive shafts extend outwardly through the adjusting sleeve 56 toward the sides of the traction unit 10, and are equipped at their outer ends with pinions 64 that are meshed with the gears 26 on the wheel hubs 23 for driving the wheels 17. To support the outer ends of the shafts 62, 63, I equip the transverse housing portion 14 with ball bearings 65, and I also equip the cover members 27 with bearings 66 to support these shafts at the outer sides of the pinions 64. It should be observed at this point that the entire traction unit 10 is extremely compact, but that I nevertheless make available a considerable amount of space for mounting the motor 47, and also for the gear differential 53. Because I utilize stub shafts 19 for the traction wheels 17, with these stub shafts mounted on the side portions 15, 16 of the traction unit, it is possible to utilize the space between these stub shafts for a part of the differential casing 49, as is clearly apparent in Fig. 6.

I have already described the extremely efficient action of the traction unit 10 forming a part of the main frame. I shall now describe, while referring to Figs. 1, 2, and 3, just how the rear axle support forms the rear end of the frame. This support takes the form of a vertical plate attached to the rear end surfaces of the side members 11, 12 by welding. It is through the rear end member or plate 13 that I mount rear steering wheels on the truck, utilizing for this purpose the construction shown in my application filed February 17, 1954, Serial No. 410,810.

Thus, I form the vertical plate 13 with a lower portion 67 extending downwardly below the side members 11, 12. I equip the lower plate portion 67 with an integral pivot 68, this pivot extending in the longitudinal axis of the truck at the forward, or inner, side of the plate 13. In the particular form shown, I mount the pivot 68 through a rectangular base portion 69 welded in an opening 70 in the lower plate portion 67. I provide a rear axle 71, Figs. 2 and 3, and I form the central portion of this axle with a bore having a pair of bearings 72 whereby the axle is mounted for rocking movement upon the pivot 68 relatively to the truck frame. To retain the axle 71 upon the pivot 68, I secure a member 73 in a transverse position on the end of the pivot 68 by screws 74. Obviously, the rocking movement of the rear axle 71 on the pivot 68 will enable wheels on the ends of the axle to move in a vertical direction to compensate for irregularities in the ground surface. I prefer to form axle 71 with lugs 75 positioned to engage the forward surface of the vertical plate 13, with these lugs acting to reduce the bending stresses to which the axle pivot 68 may be subjected when the wheels on this axle encounter an obstruction.

It will be observed that the arrangement I have described places the rear axle 71 a considerable distance below the side frame members 11, 12 and at the forward side of the rear end member 13. Thereby, the axle 71 occupies a minimum of space upon the truck. The vertical plate 13 of the truck frame does, of course, accept all those forces that are incidental to the mounting of rear steering wheels on the truck, and to reinforce the plate 13 in this respect, I weld a vertical gusset plate 76, Figs. 1, 2 and 3 between the upper surface of each side member 11, 12 and the forward surface of the rear end plate 13. If found desirable, the side members 11, 12 may be cut away below the gusset plates 76, as shown at 77 in Fig. 1, to provide increased clearance relatively to wheels and steering mechanism on the axle 71.

It is believed that those skilled in the art will now appreciate that I have contributed a frame construction that is extremely novel. I am enabled by my invention to utilize, as integral and functional parts of the main frame, necessary parts of the truck that heretofore have been merely adjuncts to the frame. Thus, through the use of the traction unit as an end member of the frame, I can dispense with a particular front end member for the frame, while the particular novel features of the traction unit enable me at the same time to provide a frame that has a very high degree of rigidity. Moreover, I can mount the trailing and steering axle through a member that, notwithstanding its extremely simple form, is actually the rear end member of the frame. This rear end member leaves the space between the rear ends of the side members 11, 12 entirely unobstructed, and also makes available a very considerable amount of space below the rear ends of these members because of the very low position of the rear axle 71. In addition, my novel traction unit enables the various truck parts and mechanism to be mounted in extremely compact relationship. The relatively wide spacing of the side frame members 11, 12 contributes to this result, and enables me further to limit the tilting movement of the uprights through direct engagement of the uprights with the side frame members. All of this I accomplish while utilizing simple continuous side frame members. I believe, therefore, that the very considerable value of my novel frame construction will be fully appreciated.

I now claim:

1. In a truck of the class described, a main frame having a pair of opposed side frame members, a plate integrally attached to corresponding ends of the side frame members to form one end of the main frame, a pivot fixed on said plate for mounting an axle to rock relatively to said frame, said side frame members extending longitudinally away from said plate toward the opposed end of the truck and having end portions in opposed relation to one another, a traction unit having a housing with driving means therein for a pair of traction wheels, seating surfaces on the housing of said traction unit adapted for seating engagement with said end portions of the side frame members, and means securing said end portions relatively to said seating surfaces whereby to assemble the traction unit in position to form with the side members and plate a complete frame with the unit acting as an end member for the frame.

2. In a truck of the class described, a main frame having a pair of opposed side frame members, a plate integrally attached to corresponding ends of the side frame members to form one end of the main frame, a pivot fixed on said plate centrally between said side frame members, an axle mounted to rock on said pivot relatively to the frame, said side frame members extending longitudinally away from said plate toward the opposed end of the truck and having end portions in opposed relation to one another, a traction unit including a housing with driving means therein and a pair of traction wheels mounted on said housing and driven by said driving means, means for securing the housing of said traction unit to said end portions of the longitudinal side frame members whereby to form with said housing members, and plate a complete frame, and said housing then positioned with said driving means between said side frame members and with said wheels at each side outwardly of said side frame members.

3. In a truck of the class described, a main frame having a pair of opposed side frame members, a plate integrally attached to corresponding ends of the side frame members to form one end of the main frame, a pivot fixed on said plate centrally between said side frame members for mounting an axle to rock relatively to the frame, said side frame members extending longitudinally away from said plate toward the opposed end of the truck and having end portions in opposed relation to one another, a traction unit including a housing with driving means therein for a pair of traction wheels, means securing the housing of said traction unit to said end portions of the longitudinal side frame members whereby the housing forms an end member for the frame, uprights for a load carrying platform, and means mounting said uprights on said traction unit housing in spaced relation to said end portions of said side frame members and with said uprights in longitudinal alignment with said side frame members.

4. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions in opposed relation to one another, a traction unit including a housing with driving means therein for a pair of traction wheels, means securing the housing of said traction unit to said end portions of the longitudinal side frame members whereby the housing forms an end member for the frame, uprights for a load carrying platform, pivots on said traction unit housing mounting said uprights to tilt in a fore-and-aft direction in longitudinal alignment with said side frame members, and stop surfaces on the said end portions of the side frame members limiting the tilting movement of the uprights in one direction.

5. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions in opposed relation to one another, a traction unit including a housing with driving means therein for a pair of traction wheels, means securing the housing of said traction unit to said end portions of the longitudinal side frame members, uprights for a load carrying platform, side portions of the traction unit housing extending longitudinally beyond said end portions of the side frame members, and means mounting said uprights on said side portions of the traction unit housing in longitudinal alignment with said side frame members.

6. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions in opposed relation to one another, a traction unit including a housing with driving means therein for a pair of traction wheels, means securing the housing of said traction unit to said end portions of the side frame members, uprights for a load carrying platform, side portions of the traction unit housing extending longitudinally beyond said end portions of the side frame members, and pivots on the said side portions of the traction unit housing mounting said uprights for tilting movement in a fore-and-aft direction in longitudinally alignment with said side frame members.

7. In a truck of the class described, a main frame having a pair of opposed side frame members, a plate integrally attached to corresponding ends of the side frame members to form one end of the main frame, means for mounting an axle of said plate, a traction unit including a housing with driving means therein for a pair of traction wheels, means securing the housing of said traction unit to those end portions of the side frame members opposed to the ends to which said plate is attached, uprights for a load carrying platform, side portions of the traction unit housing extending longitudinally beyond said end portions of the side frame members, pivots on the said side portions of the traction unit housing mounting said uprights for tilting movement in a fore-and-aft direction in alignment with end surfaces on said side frame members, and said end surfaces on the said side frame members adapted for engagement with the uprights whereby to limit the tilting movement of the uprights in one direction.

8. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions in opposed relation to one another, a traction unit including a housing with driving means therein for a pair of traction wheels, means securing the housing of said traction unit to said end portions of the longitudinal side frame members, uprights for a load carrying platform, pivots on said traction unit housing mounting said uprights in longitudinal alignment with said side frame members for tilting movement toward and away from said side frame members, and a ram mounted in alignment with the side frame member and upright at each side of the truck for tilting the uprights on their pivots.

9. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions in opposed relation to one another, a traction unit including a housing with driving means therein and a pair of traction wheels driven by said driving means, means securing the housing of said traction unit to said end portions of the longitudinal side frame members whereby the housing forms an end member for the frame, side portions of said traction unit housing through which said traction wheels are mounted in juxtaposed relation to the outer sides of the side frame members, a pair of uprights for a load carrying platform, and means mounting said uprights on said side portions of the housing in longitudinally aligned relation to the side frame members and intermediate said wheels.

10. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions is opposed relation to one another, a traction unit including a housing with side portions for mounting a pair of traction wheels and a transverse portion extending between said side portions, means securing the transverse housing portion of said traction unit rigidly in position below said end portions of the longitudinal side frame members whereby to equip the frame with an opposed end member, a pair of uprights for a load carrying platform, means mounting said uprights on said side portions of the housing in longitudinally aligned relation to the side frame members, the traction unit further including a traction motor for driving the wheels, and means mounting said traction motor on the said transverse portion of the housing in position intermediate the side members of the frame.

11. In a truck of the class described, a main frame having a pair of opposed side frame members, a plate integrally attached to corresponding ends of the side frame members to form one end of the main frame, means for mounting an axle on said plate, said side frame members extending longitudinally away from said plate toward the opposed end of the truck and having end portions in opposed relation to one another, a traction unit including a housing with side portions and a transverse portion extending between said side portions, means securing the transverse housing portion of said traction unit to said end portions of the longitudinal side frame members whereby to equip the frame with an opposed end member, a pair of uprights for a load carrying platform, means mounting said uprights on said side portions of the housing in longitudinally aligned relation to the side frame members and spaced relatively to the transverse portion of the housing, a pair of traction wheels, and means mounting said traction wheels on the side portions of the housing to support the traction unit in an axis intermediate the transverse housing portion and the pair of uprights.

12. In a truck of the class described, a main frame having a pair of opposed longitudinally extending side frame members, a vertical plate integrally attached to corresponding ends of the side frame members to form one end of the main frame, means integral with said plate for mounting an axle on said plate for pivoting movement about an axis parallel to the longitudinal axis of the truck, said side frame members extending longitudinally away from said plate toward the opposed end of the truck and having end portions in opposed relation to one another, a traction unit including a housing with side portions for mounting a pair of traction wheels and a transverse portion extending between said side portions, means securing the transverse housing portion of said traction unit rigidly to said end portions of the longitudinal side frame members whereby to equip the frame with an opposed end member, a traction motor for said traction unit, and means mounting said traction motor on the said transverse portion of the housing in a position between the side members of the main frame.

13. In a truck of the class described, a pair of longitudinally extending side frame members, an axle supporting member extending between corresponding ends of said side frame members and fixed thereto, a traction unit including a housing with opposed side portions and a transverse portion positioned between said side portions, means securing the transverse housing portion of said traction unit rigidly between the opposite corresponding ends of said longitudinally extending side frame members and just inwardly of those ends, means mounting a pair of traction wheels on the side portions of the housing with said wheels each lying outwardly beyond the side frame members, a pair of uprights, and means mounting said uprights on said side portions of the housing in longitudinally aligned relation to the side frame members and just beyond the said opposite ends of said side frame members.

14. In a truck of the class described, a main frame having a pair of opposed longitudinally extending side frame members, a vertical plate integrally attached to corresponding ends of the side frame members to form one end member of the main frame, a lower portion of said plate extending downwardly below the side frame members, a pivot shaft fixed on said lower portion of the plate and extending longitudinally parallel to the said side frame members in the longitudinal axis of the truck for mounting an axle to rock relatively to said frame on said longitudinal axis, said side frame members extending longitudinally away from said plate toward the opposed end of the truck and having end portions in opposed relation to one another, a traction unit including a housing with driving means therein for a pair of traction wheels, and means securing the housing of said traction unit rigidly to said end portions of the longitudinally extending side frame members whereby to equip the frame with an opposed end member and to complete the frame of the truck.

References Cited in the file of this patent

UNITED STATES PATENTS

| | | |
|---|---|---|
| 1,002,858 | McCue | Sept. 12, 1911 |
| 1,278,650 | Newitt | Sept. 10, 1918 |
| 1,610,958 | Leister | Dec. 14, 1926 |
| 1,937,839 | Parrett | Dec. 5, 1933 |
| 1,991,577 | Remde | Feb. 19, 1935 |
| 2,216,697 | Vossenberg | Oct. 1, 1940 |
| 2,264,512 | Dunham | Dec. 2, 1941 |
| 2,304,040 | Ulinski | Dec. 1, 1942 |
| 2,362,129 | Gforer | Nov. 7, 1944 |
| 2,471,429 | Hawkins | May 31, 1949 |
| 2,625,285 | Weaver | Jan. 13, 1953 |